United States Patent [19]

Samad

[11] Patent Number: 5,063,605
[45] Date of Patent: Nov. 5, 1991

[54] METHOD FOR SCALE AND ROTATION INVARIANT PATTERN RECOGNITION

[75] Inventor: Tariq Samad, Minneapolis, Minn.

[73] Assignee: Honeywell Inc., Minneapolis, Minn.

[21] Appl. No.: 549,871

[22] Filed: Jun. 4, 1990

[51] Int. Cl.$^5$ .............................................. G06K 9/00
[52] U.S. Cl. ................................... 382/44; 250/208.1; 382/46; 382/68
[58] Field of Search ...................... 382/45, 46, 68, 44, 382/30, 28; 250/578, 208

[56] References Cited

U.S. PATENT DOCUMENTS

| | | | |
|---|---|---|---|
| 3,050,711 | 8/1962 | Harmon | 382/68 |
| 3,255,437 | 6/1966 | Singer | 382/28 |
| 4,561,105 | 12/1985 | Crane et al. | 382/30 |
| 4,658,428 | 4/1987 | Bedros et al. | 382/46 |
| 4,922,543 | 5/1990 | Ahlbom et al. | 382/46 |

OTHER PUBLICATIONS

"Toward the Robot Eye" Schenker *Brown University Technical Report* Jul./Oct. 1981, pp. 8 et seq.

*Primary Examiner*—Leo H. Boudreau
*Attorney, Agent, or Firm*—Michael B. Atlass

[57] ABSTRACT

A method for scale and rotation invariant pattern recognition. The method involves the recogniziing of patterns, such as visual images of objects, irrespective of scale or two-dimensional orientation. A prior art format for representing data known as a polar exponential grid or PEG format is utilized. For storage, patterns are centered, transformed into a PEG representation, and the centered PEG representation is stored in an associative memory. For recall, patterns are likewise centered and transformed into a PEG representation. They are then first scaled up until the outer layer of the PEG grid is activated, and then incrementally rotated until either a desired level of match is found with some stored pattern, or until a 360 degrees rotation has been completed without a match. Hardware implementation for the PEG transformation and for the incremental rotation and scaling are described.

11 Claims, 8 Drawing Sheets

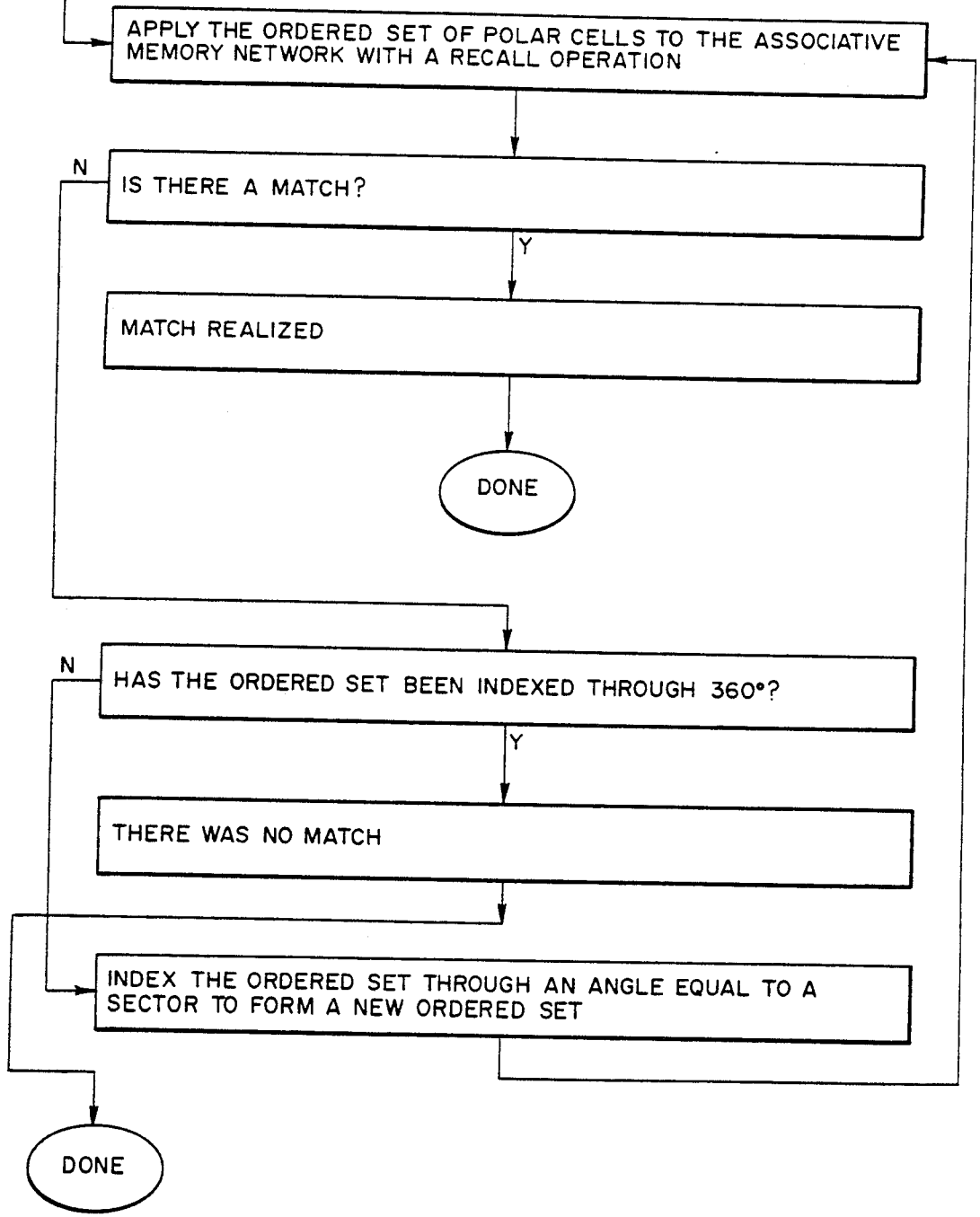

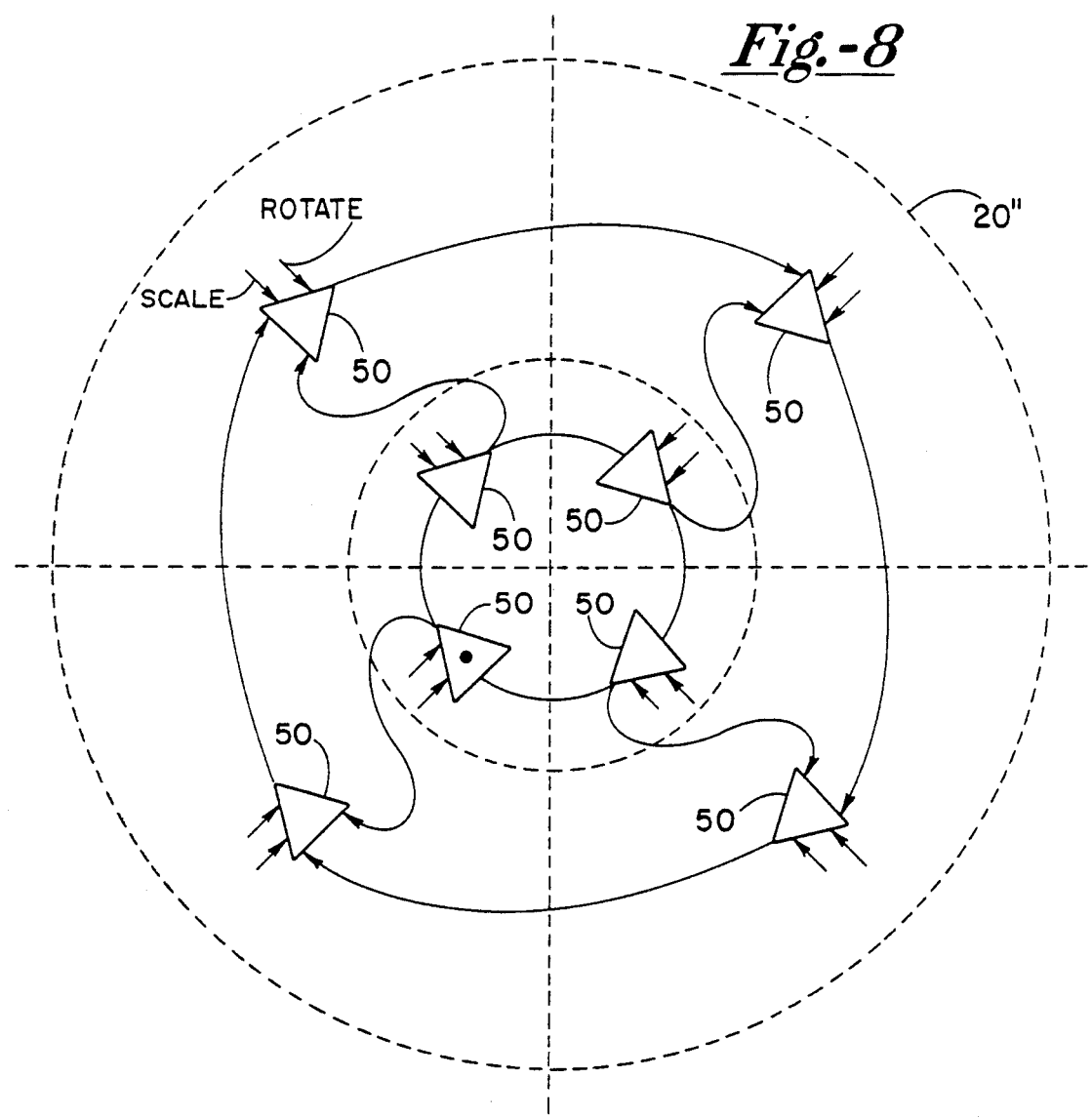

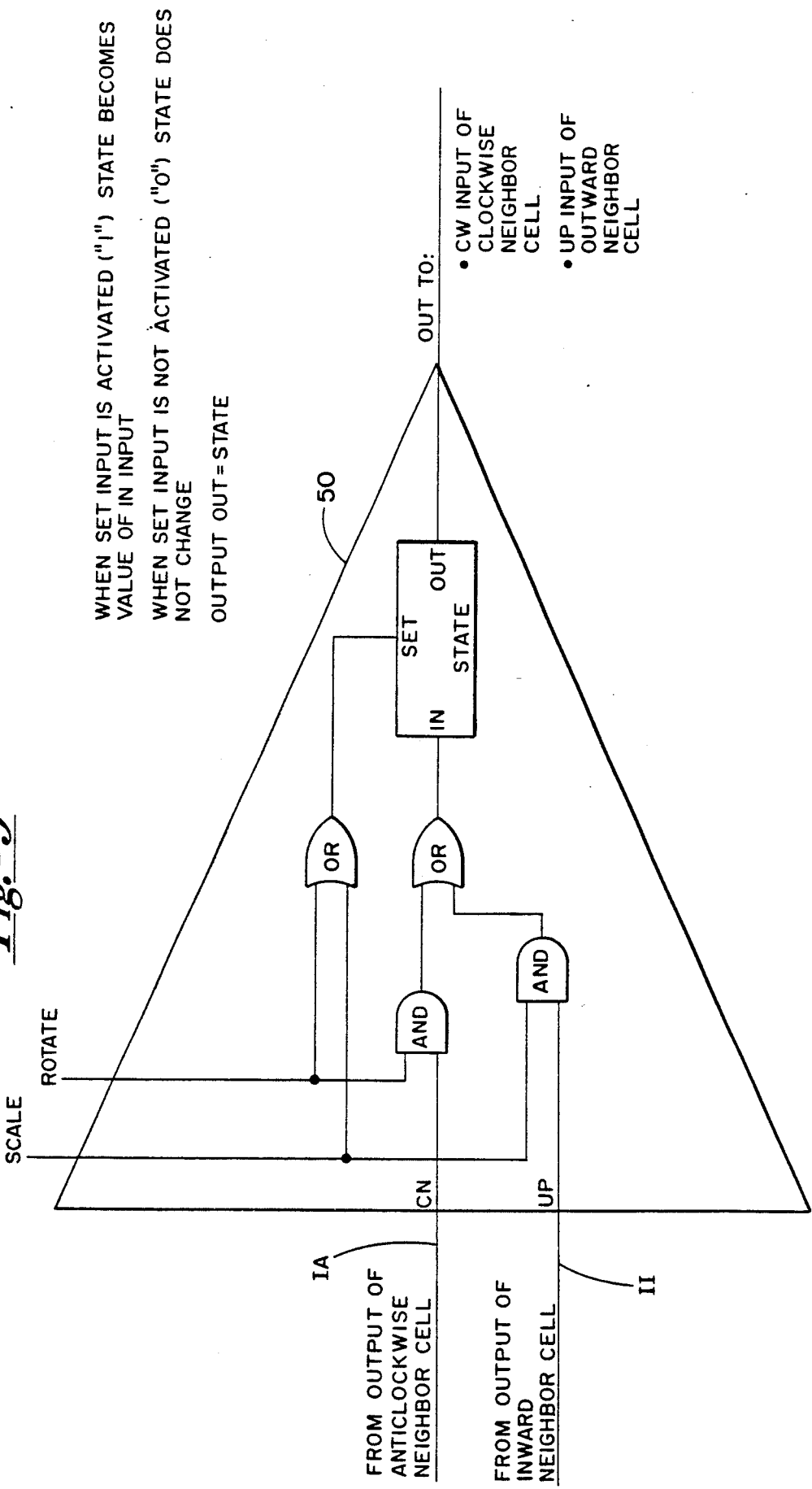

METHOD FOR SCALE AND ROTATION INVARIANT PATTERN RECOGNITION

The invention relates to a method for recognizing patterns, such as visual images of objects, irrespective of scale or two-dimensional orientation.

A building block for the invention is a prior art format for representing data known as a polar exponential grid or PEG format.

A PEG format is disclosed in a July 1981 article titled TOWARD THE ROBOT EYE: (in search of) AN ISOMORPHIC IMAGE TRANSFORM FOR MACHINE VISION by Paul S. Schenker. This was issued as Technical Report #ENG RV 81-1 of the Division of Engineering, Brown University, Providence, R.I. 02912.

Another prior art building block for this invention is an associative or content addressable memory. An associative memory is a device that can be used to store patterns ("memories") and subsequently to retrieve them associatively. That is, given a recall cue, an associative memory will return a stored pattern that is "close" (in some appropriate sense) to the cue. For example, a recall cue can be a noisy or an incomplete version of a stored pattern and the associative memory will return the corresponding stored (complete, noise-free) pattern.

As with conventional computer memories, it is useful to distinguish between two operating regimes which are typically separate procedures for storing a pattern and for retrieving a pattern.

The invention herein is not limited to any particular form of associative memory. In addition to neural network models, more conventional associative retrieval techniques can also be used. Some associative memory models provide additional functionality such as matching on only a portion of stored patterns or returning a list of ranked candidate stored patterns.

For storage, in the invention herein, patterns are centered, transformed into a PEG representation, and the centered PEG representation is stored in an associative memory. Patterns are stored at maximum resolution, that is, at least one segment in the outermost ring of the PEG is activated.

For recall, in the invention herein, patterns are likewise centered and transformed into a PEG representation. They are then first scaled up until the outer layer of the PEG grid is activated, and then incrementally rotated until either a desired level of match is found with some stored pattern, or until a 360 degrees rotation has been completed without a match.

The scaling up and rotation are elementary operations on the PEG.

A main object of the invention is to provide a new and improved method for recognizing patterns irrespective of scale or two-dimensional orientation.

A further object of the invention is to provide a new and improved method for preparing an image of an object for representation in an associative memory.

Other objects and advantages of the invention will become apparent from the following specification, appended claims and attached drawings.

In the drawings:

FIGS. 3A and 3B show a flow chart for a software program which facilitates practicing the invention;

Figure 5A:
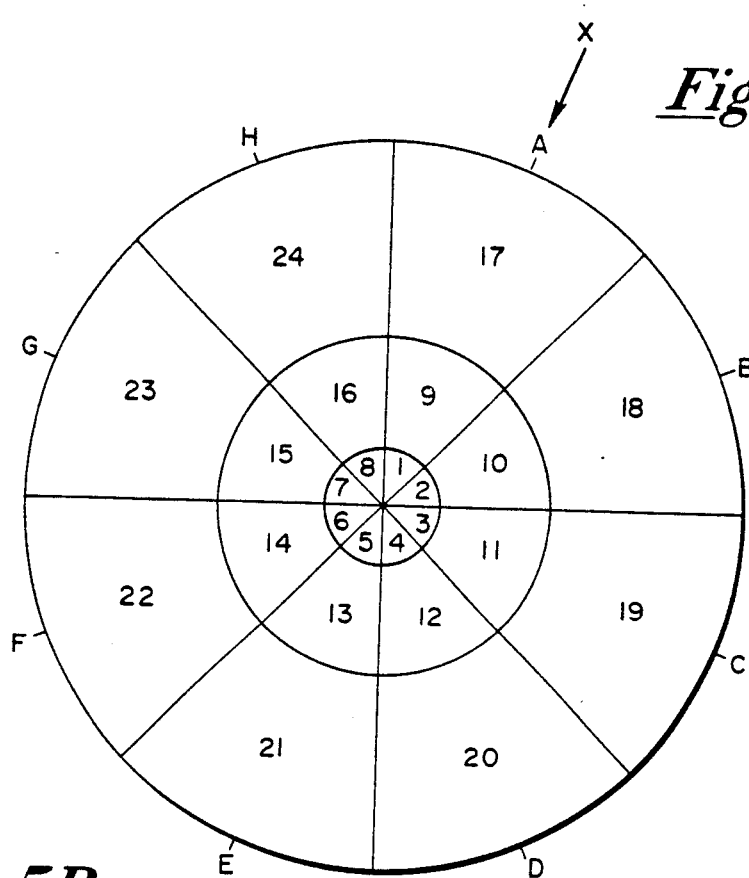
FIG. 5a shows a PEG format representation with numbered cells.
Figure 5B:
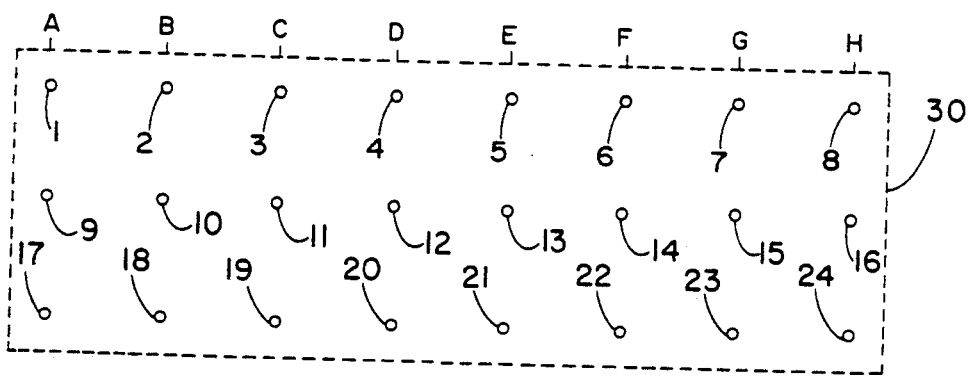
Figure 5C:
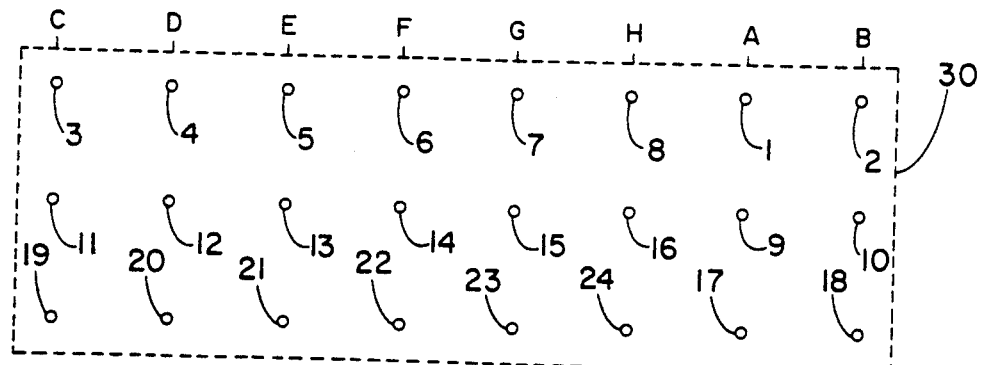
Figure 6A:
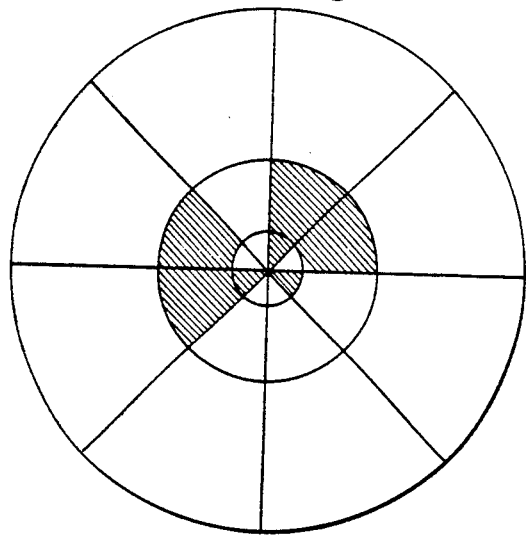
Figure 6B:
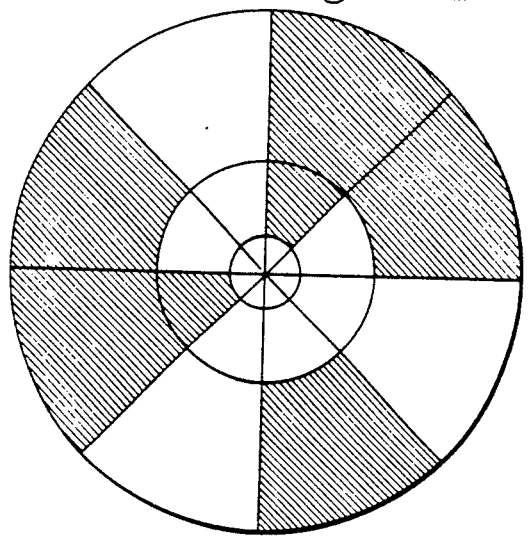
Figure 7:
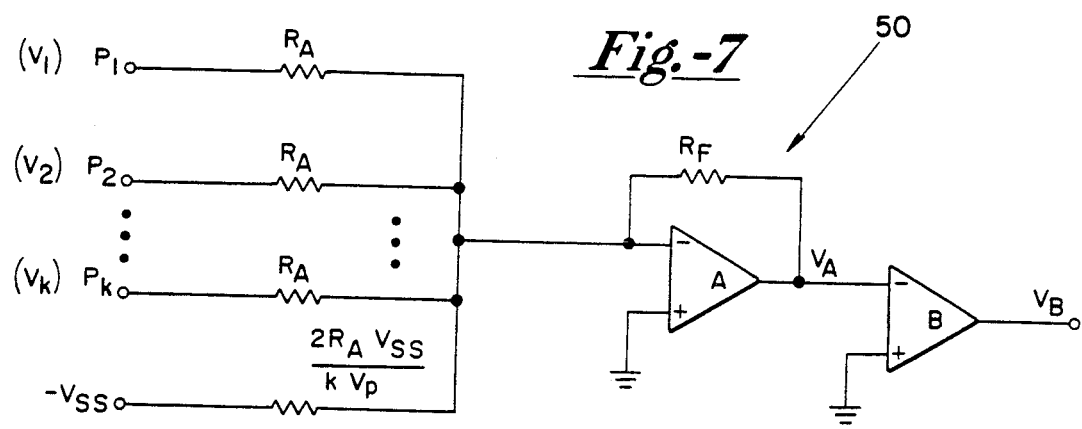

FIGS. 5b and 5c respectively show the specific applying of the numbered PEG cells of FIG. 5a to the inputs of an associative memory first for an initial setting and then for a subsequent rotated setting;

FIGS. 6a and 6b illustrate a scaling up operation wherein the status of each inner segment of a PEG representation is passed to its radially outward neighbor;

FIG. 7 shows a hardware architecture for transforming a rectangular grid to a polar exponential grid (PEG);

FIG. 8 shows a hardware architecture for the incremental rotation and scaling of an array of PEG cells; and FIG. 9 shows how a PEG cell can be constructed from conventional digital logic elements.

In the invention herein at least one prototype image of a two-dimensional object or pattern is stored in an associative memory, which may be a neural network, and means is provided for comparing objects of interest (referred to as test objects) to one or more prototype objects to make pattern recognition determinations. Preprocessing or normalizing of the prototype object, and the test objects to be compared thereto, involves mapping from a rectilinear format to a polar format and, in particular, to a polar exponential grid format.

Figure 1:
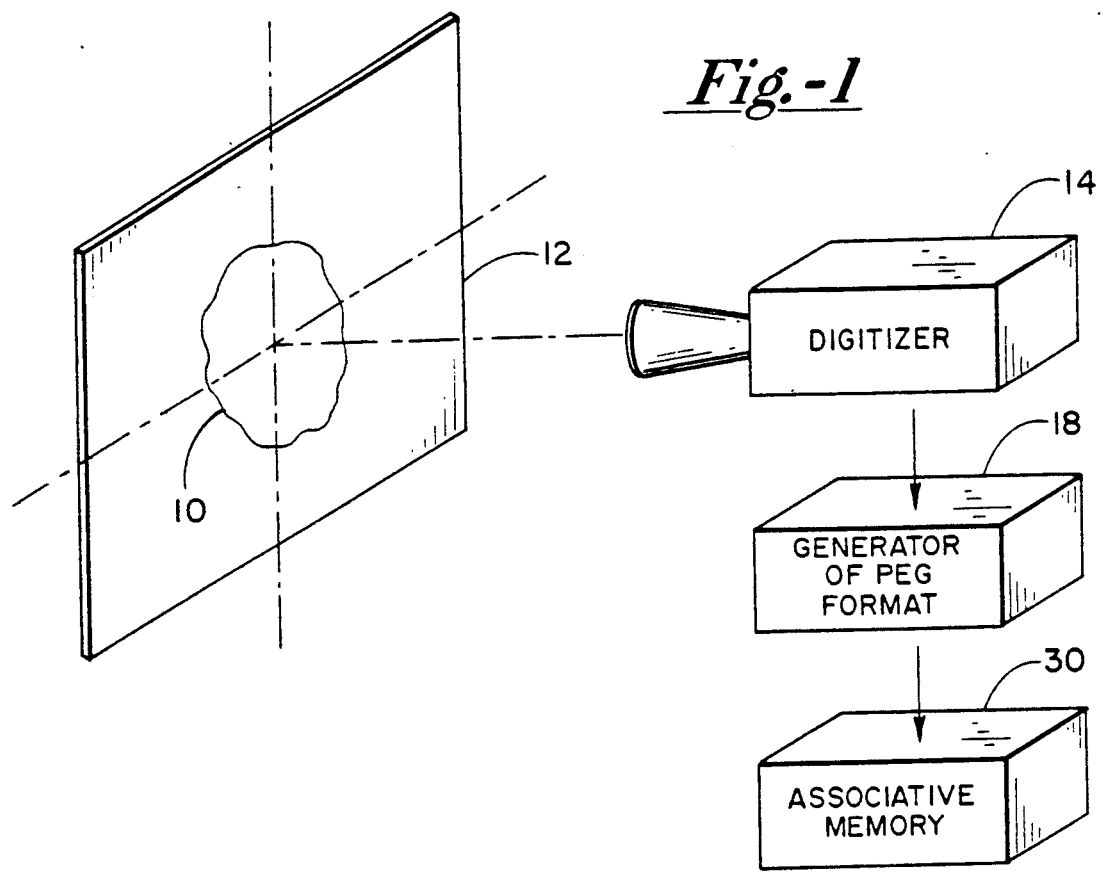
FIG. 1 shows a schematic arrangement for preparing, in accordance with the invention, an image of an object for representation in an associative memory which includes a digitizer, a generator of a PEG format and an associative memory.

The first step in the preprocessing operation is to center the object (a prototype object or a test object, as the case may be) to a canonical position. The object is centered around its "center of mass" by any suitable prior art procedure such as the procedure disclosed in applicant's copending application Ser. No. 270,183, filed Nov. 14, 1988. A digital image of a mass-centered prototype or test object and the background thereof is input into an associative memory. The background should be free of interfering visual "noise" and the object is fully contained within the background as seen by the digitizer. This process is illustrated schematically in FIG. 1 which shows an object 10, which is centered canonically within a square border 12 which provides a noiseless background, in the field of view of a state of the art digitizer 14. (The border can be any shape.) The digitizer, which converts an image into a numerical representation, is connected to a software or hardware type processor 18 which functions to generate a PEG format and to incrementally scale up the PEG representation so that at least one cell in the outermost ring is activated. If the object is a prototype object, the PEG representation is applied to the inputs of the associative memory in a "storage" mode. If the object is a test object, the PEG representation is incrementally rotated. At each rotational step, the representation is applied to the input of the associative memory in a "retrieval" (or "recall") mode. The associative memory indicates whether the representation matches (within a given tolerance) any prototype object. The incremental rotation continues until either a match is found or a full 360° rotation has been accomplished.

The digital image of the object loaded from the digitizer 14 into the generator 18 has the form f(x,y) where x and y denote rectangular spatial coordinates and the value f at any point is proportional to the brightness or gray level of the image at that point. A typical size for the image would be a 512×512 array of pixels.

The principles of the invention are illustrated herein, however, in connection with a 12×12 rectangular array which, although satisfactory for illustration purposes, probably has no practical application.

In the invention herein it is only essential for the values of f to be either 0 or 1 to represent prototype and test objects.

Figure 2:
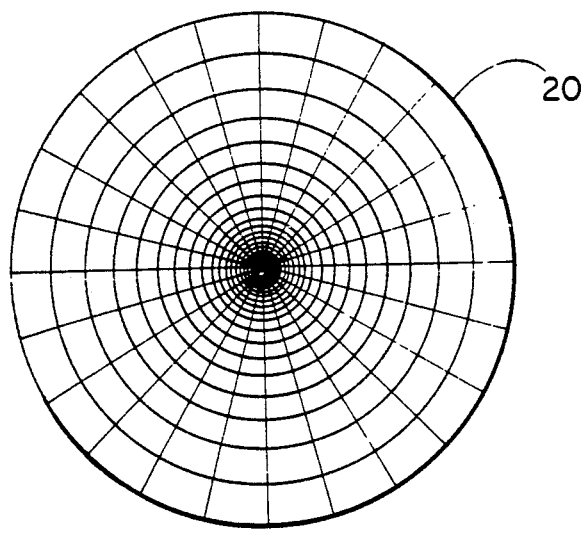
FIG. 2 shows a prior art polar exponential grid (PEG) format which facilitates practicing the invention.

The polar exponential grid (PEG) referred to above is shown as a grid 20 in FIG. 2. The resolution represented by the segments thereof will normally be much greater than is illustrated in FIG. 2 but this will depend upon the nature of the objects involved.

Figure 3A:
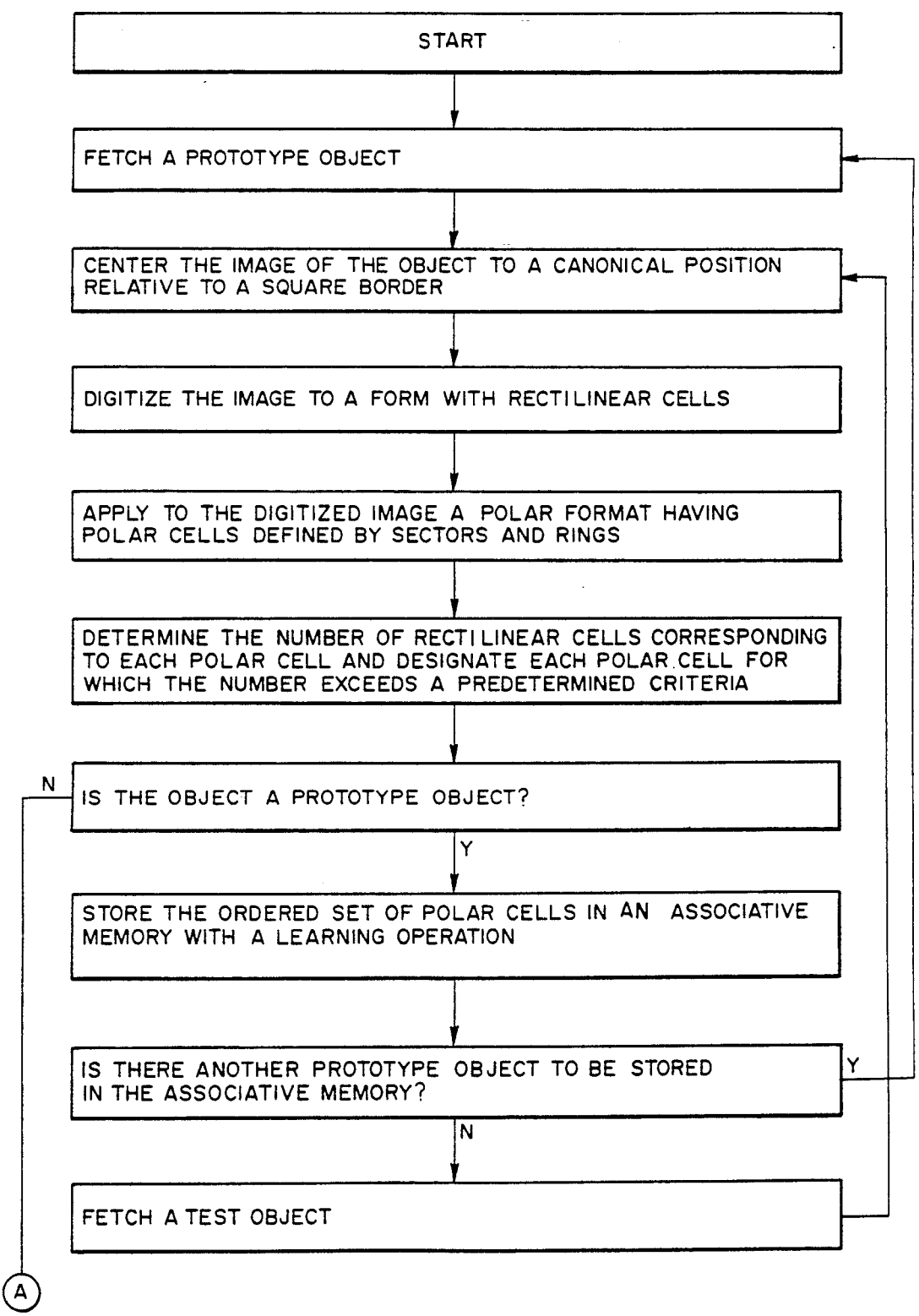

A software program is provided which is represented by a flow chart shown in FIG. 3. The software program includes a representation of the polar grid 20 and also defines associated parameters for setting the diameter and resolution of the polar grid. The software program operates to superimpose the polar grid 20 onto a 512×512 array as illustrated schematically in FIG. 4 where a polar grid 20' having eight segments is shown superimposed by way of example upon a 12×12 rectangular memory array 24. By way of identification, the 144 memory locations of the 12×12 array are referred to as rectangular cells and the eight memory locations of the polar exponential grid 20' are referred to as PEG cells or segments.

The software program performs an enlarging scaling operation on the representation of the object 10 (FIG. 1) relative to the 12×12 memory array (FIG. 4) to obtain an enlarged representation 10' within the limits defined by the circumference of the polar grid 20'.

Figure 4:
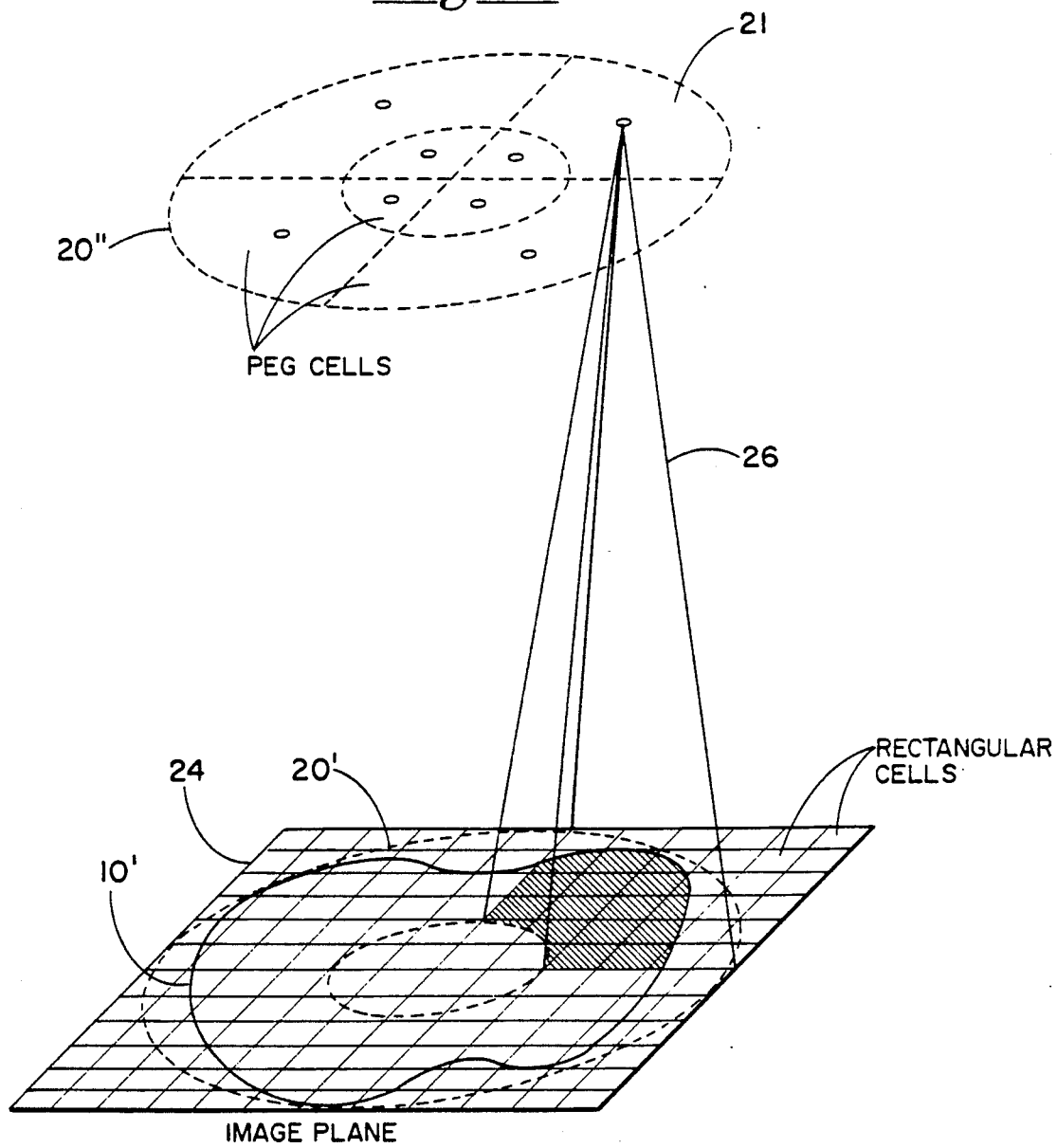
FIG. 4 is a schematic indication of how a representation of an image is converted from rectangular coordinates to a form of polar coordinates by a software program or a hardware implementation in accordance with the invention.

FIG. 4 shows a projection 20" of the polar grid 20' for the purpose of illustrating how a mapping operation from the rectangular grid 24 to the polar grid 20' is performed by a software program or a hardware implementation in accordance with the invention. FIG. 4 illustrates how the PEG cells overlay the rectangular cells. The projection lines 26 illustrate or suggest that each segment or cell of the PEG 20", such as a cell 21, corresponds to a plurality of underlying rectangular cells. The mapping operation of the software program or a hardware implementation sums for each PEG cell the respective number of corresponding rectangular cells which are covered by the enlarged object 10' within the area covered by the PEG cell. If this value exceeds one-half (or some other appropriate or desired ratio) of the total number of covered rectangular cells covered by the corresponding PEG cell, the PEG cell is given an occupied or "1" status.

FIG. 4 shows as indicated above the correspondence between the PEG cells and the rectangular cells and the rectangular cells covered by the object 10'. In this example the rectangular quadrant of the outer ring corresponding to the PEG cell 21 has about seventy percent of the rectangular cells thereof covered by the object 10'. If the predetermined criterion for activating or declaring PEG cell 21 to have an "on" status was 50 percent, PEG cell 21 would have an "on" status in this case.

The rings of the PEG 20 have an outwardly increasing exponential spacing as illustrated although it is intended that the invention also covers a uniform spacing of the rings.

Each cell or segment of the PEG 20 has a specific PEG address corresponding to its ring and sector location. Each sector may be viewed as a module having an ordered set of PEG cells represented by a memory word, or a group of memory words, corresponding to the number of rings a PEG 20 has.

The software program or a hardware implementation then outputs the "0" and "1" values of the PEG cells (in hardware it would be done in parallel), and this constitutes a PEG representation of an object. A PEG representation of a prototype object is applied to the inputs of an associative memory 30 (FIG. 1) and, via a learning process, the PEG representation is converted to a stored pattern which is available to be used in response to a recall cue produced by a test pattern to perform associative match operations.

In a recall operation, the software program or a hardware implementation operates to process each test object which is to be compared with the prototype object in the same way that the prototype object is processed as described above. A PEG representation of a test object is inputted to the associative memory 30 in the same way as a prototype object and an associative match test is made by the associative memory via its recall mode. If there is no match the generator 18 (either a software or hardware version) rotates the PEG representation of the test object through an angle equal to a sector angle and applies the rotated image to the associative memory inputs to facilitate another associative match test. This procedure is continued until either an associative match is indicated or until the PEG image of the test object has been rotated a full 360 degrees without any indication of an associative match.

From the conceptual standpoint the invention operates to sequentially rotate a PEG representation of a test object relative to stored PEG representations of prototype objects in seeking an associative match. It will be understood however that various input combinations of the objects to an associative memory could be utilized to realize or achieve the conceptual object.

An example of how PEG representations of objects are applied to inputs of an associative memory 30 is shown in FIGS. 5a, 5b and 5c.

FIG. 5a shows a PEG representation with an arbitrary cell numbering system and an arbitrary sector lettering system. FIGS. 5b and 5c show schematically two of eight possible arrangements for connecting the PEG representation of FIG. 5a to 24 input terminals of the associative memory 30.

Referring to a symbolically represented index marker X (FIG. 5a), the software program would operate in cooperation with the learning mode of the associative memory 30 and apply a PEG representation of a prototype object to the inputs thereof with the index A setting as shown in FIG. 5b. The recall mode involves turning the PEG representation through a full 360 degrees with eight settings. This involves rotating the PEG representation so that the settings A to H would be sequentially moved into circumferential alignment with the index marker X for a series of eight associative match tests.

The first associative match test in the recall mode could start with any desired setting A to H. If the recall mode started with the setting A, for example, the third setting C would be as illustrated in FIG. 5c wherein the C sector cells 3, 11 and 19 would be connected to the first column of the inputs of the associative memory 30.

Another form of scaling up similar to that described above for enlarging the image of a prototype or test object is shown in FIGS. 6a and 6b. Each prototype or test object outputted from the generator 18 has been processed therein to obtain a maximum size PEG representation in which the outer ring of the PEG has at least one active segment. FIGS. 6a and 6b illustrate the scaling up operation wherein the status (shaded segments "on" and unshaded segments "off") of each segment is passed to its radially outward neighbor. This transfer of status from one PEG segment radially outwardly to another segment continues as illustrated in FIGS. 6a and 6b until at least one cell or segment in the outer ring is activated.

By way of summary, patterns (i.e., prototype objects) in the PEG format may be stored in any orientation. For rotation-invariant recognition, a pattern to be checked for recognition (i.e. a test object) in the PEG format is rotated clockwise or anti-clockwise incrementally. After each incremental rotation, the associative memory is checked. At any point, if the associative memory indicates a match with a prestored pattern, then the pattern has been recognized. If a complete rotation is completed without a match, the pattern is not recognized. In the rotation process a "rotate" signal is repeatedly given until recognition or full rotation occurs.

During each scale-up step, each PEG cell takes on the activation of its inward neighbor. This leaves the inner PEG cells vacant but that is not a problem because the resolution of the original image is too low in any case to permit assigning accurate activity levels to the innermost PEG cells. The implication is that if the initial PEG representation of the image does not show activity in any ring beyond the nth, then after the scale-up has been completed, only the n outermost rings of the PEG cells can be used for the associative match. The associative memory must allow matching on only part of the stored pattern.

The time it takes to recognize a pattern depends on (a) its size relative to the (full) size of the stored pattern and (b) its orientation relative to the stored orientation. In many applications, this is a desirable feature because recognition time is an indication of how different an object is from the stored prototype object.

It may be noted that the accuracy and speed of the scheme depend in opposite ways on the resolution of the PEG. The higher the radial and angular resolution, the better the expected accuracy and the greater the expected recognition time. It is an application-specific task to determine the number of "rings" and "wedges" that are optimal.

Multiple grids can be used concurrently for faster recognition without sacrificing accuracy. For example, with two PEG grids, one can be used for rotating from 0 to 180 degrees, the other from 180 to 360.

The PEG may use real-valued cells instead of binary (ON or OFF) valued cells. Increased accuracy could thereby be expected, provided that the associative memory can handle this.

In high-noise environments, the initial PEG pattern may not reflect the true size of the observed image. To compensate for this, the incremental rotation can be done at more than one scale.

FIGS. 7 to 9 show hardware architecture for transforming an image in a rectangular grid to an equivalent image in a polar exponential grid.

The cells of the rectangular grid and the PEG cells are assumed to represent binary pixels although the invention is also applicable to continuous valued representations.

An object 10' in the image plane of a rectangular grid 24 as shown in FIG. 4 is transferable to the PEG hardware in an initializing operation. The PEG hardware operates independently of the rectangular representation after it is initialized.

Each PEG cell, such as cell 21 in FIG. 4, corresponds to a section of the image plane represented by a certain number of rectangular cells. A PEG cell is initialized to a logical "1" if some predetermined fraction (e.g. one-half) of the corresponding rectangular pixels are ON; otherwise it is to be initialized to a logical "0". $V_p$ represent the voltage level corresponding to a pixel being ON and an OFF pixel is represented by 0 volts. The hardware shown in FIG. 7 accomplishes the transformation.

For each PEG cell, a summing amplifier A is utilized. The inputs $p_1, p_2, \ldots p_k$ are the outputs of the rectangular pixels corresponding to the PEG cell (k is the number of rectangular pixels corresponding to the PEG cell, a function of the PEG cell's radial position) as shown in FIG. 4. If more than half of the corresponding rectangular pixels are on, the output of the summing amplifier will be negative; if less than half, it will be positive. The second amplifier B is operated in high gain, open-loop mode. For any negative input into its inverting terminal, its output will be positive; for any positive input into this terminal, the output is negative. For our purpose herein the output of B is either a logical "1" or a logical "0".

The output of B in each case is used to initialize a PEG cell. Since the architecture of FIG. 7 is duplicated for every PEG cell, this initialization occurs in parallel for the entire PEG array. Once the PEG array is initialized, activity in it can be incrementally rotated and scaled in parallel via the architecture shown in FIGS. 8 and 9.

FIG. 8 shows a PEG cell array comprising cells 50 corresponding to the simple PEG partitioning of the image plane as shown in FIG. 4. There is one PEG cell for every PEG segment. The output of each PEG cell 50 is a logical "1" or "0" and serves as input to two other PEG cells which are its radially outward neighbor and its clockwise neighbor. Each cell 50 receives two global inputs: ROTATE and SCALE. When the ROTATE signal is given, each PEG cell passes its state to its clockwise neighbor. When the SCALE signal is given, each cell passes its state to its outward neighbor. An entire ROTATE or SCALE operation happens in parallel, synchronously.

FIG. 9 shows how a PEG cell 50 can be constructed from conventional digital logic elements. Each cell requires two two-input AND gates, two two-input OR gates, and a one-bit register to hold the state of the cell. The state of the cell changes only when the SET input is high, at which point the current level at the IN input becomes its state. The output of the cell is always the current content of the state register. To avoid race conditions, it may be advisable to have the state change occur only at the downward transition of the SET input.

Not shown in FIGS. 8 and 9 are the initialization circuitry and the outputs to the associative memory to be used for determining matches as outlined in FIGS. 5a, 5b and 5c.

It will be understood with regard to the hardware of FIGS. 7 to 9 that the amplifier elements 50 respectively represent PEG cells but have no special physical relationship relative to each other except that their inputs are from related parts of the image. In this sense the polar grid and polar cells are merely pseudo in nature and it is only the ordered relation of the polar cells applied to the inputs of an associative memory as shown in FIGS. 5a, 5b and 5c that has any relevance.

It is claimed:

1. A method for preparing an image of an object for representation is an associative memory comprising the steps of:
   preparing on a rectilinear grid of source cells a digitized image of said object within a background which is centered relative to its "center of mass",
   preparing a polar grid format having a circumference fully contained within said background and large enough to fully contain any object to be represented and destination cells formed by a plurality of sectors of equal angles and a plurality of rings spaced at different radii from the center of said circumference,
   mapping said image from said rectilinear grid to said polar grid and determining for each of said destination cells the number of said source cells within its bounds occupied by said object, and
   designating as active each of said destination cells for which said number exceeds a predetermined criterion.

2. A method pursuant to claim 1 wherein said rings are exponentially spaced relative to said center of said circumference.

3. A method for scale and rotation invariant pattern recognition comprising the steps of:
   A. centering an object image, which may be a prototype object image or a test object image, to a canonical position,
   B. digitizing said object image to form a digitized object image (DOI) having Cartesian coordinates and storing said DOI,
   C. mapping said stored DOI to a polar grid having (1) equal angled sectors and (2) a set of cells formed by said sectors and rings spaced from the origin of said polar grid,
   D. forming an ordered representation of said cells in which each cell for which the percentage of overlap relative thereto to said DOI exceeds a predetermined percentage as the status of an active cell,
   E. if said DOI is a test DOI (TDOI), go to step H,
   F. if said DOI is a prototype DOI (PDOI), storing said ordered representation of said cells in an associative memory with a learning operation,
   G. fetching a test object image for centering and returning to said step A,
   H. applying said ordered representation of said cells to said associative memory with a recall operation,
   I. declaring success if an associative match occurs,
   J. if indexing has not been performed, go to step L,
   K. determining if said indexing has been performed through 360° and, if so, declaring failure,
   L. indexing said ordered representation of said cells through an angle equal in size to the angle described by the equal angled sectors in step C, and returning to step H.

4. A method according to claim 3 wherein said rings are exponentially spaced relative to said origin of said polar grid.

5. A method for scale and rotation invariant pattern recognition, as set forth in claim 3 and further comprising a modification to step K wherein when said indexing has been performed through 360° and no match is determined, a scaling of said ordered representation is performed and the method is returned to step H until the object image ordered representation and a predetermined number of scaling operations has been performed.

6. A method as set forth in claim 3 wherein between steps H and I scaling said ordered representation if no associative match occurs and applying said scaled-up ordered representation of said cells to said associative memory with a recall operation, then scaling further until a predetermined number of scaling operations has been performed and reapplying said ordered representation of said cells to said associative memory with a recall operation at each scaling iteration, and declaring success if an associative match occurs at any stage in the scaling and matching operation.

7. Apparatus for scale and rotation invariant pattern recognition, comprising:
   a source image plane, having rectangular coordinates formed of rectangular cells, and
   a polar destination unit having polar coordinates formed of polar cells, each of said polar cells related by logical correspondents in an overlapping relationship and in communication consistent with and through said relationship with a group of said rectangular cells, and
   amplifier means for each of said polar cells having inputs in corresponding ones of said rectangular cells and threshold means for each of said amplifier means effective to turn on said amplifier means when a predetermined number of said rectangular cells to said amplifier means are actuated.

8. Apparatus according to claim 7 including control means for switching the status of each of said polar cells from a source cell to a contiguously located adjacent one of said polar cells which is a destination cell.

9. Apparatus according to claim 8 wherein said contiguously located destination cell is angularly adjacent said source cell.

10. Apparatus according to claim 8 wherein said contiguously located destination cell is radially outward from said source cell.

11. A PEG cell for an array of polar arranged cells each having a state output indicating the state thereof and in which said array said PEG cell would have a radially inward neighbor cell (I) and an angularly adjacent neighbor cell (A), said PEG cell comprising, respective inputs (II) and (IA) connected respectively to said state outputs of said (I) and (A) cells, scale and rotate control inputs, a one bit state register having data and set inputs and an output for indicating the state of said PEG cell, means connecting said scale and rotate inputs to said register and to said (II) and (IA) inputs so that a set signal on one of said control inputs will enable a corresponding one of said state outputs of said (I) and (A) cells to be relayed to and provide a state output for said register.

* * * * *